United States Patent [19]

Washo et al.

[11] Patent Number: 4,920,437
[45] Date of Patent: Apr. 24, 1990

[54] DISC CLAMPING DEVICE

[75] Inventors: Junichi Washo, Ikoma; Shigeo Terashima, Tenri; Toshihisa Deguchi, Nara; Masahiro Horii, Nara; Takao Hyuga, Nara; Kenji Ohta, Nara, all of Japan

[73] Assignee: Sharp Kabushiki Kaisha, Osaka, Japan

[21] Appl. No.: 29,610

[22] Filed: Mar. 25, 1987
(Under 37 CFR 1.47)

[30] Foreign Application Priority Data

Mar. 25, 1986 [JP] Japan .................................. 61-67640

[51] Int. Cl.$^5$ .................... G11B 17/028; G11B 5/012
[52] U.S. Cl. ................................................. 360/99.05
[58] Field of Search .......................... 360/97, 99, 133; 369/270, 271

[56] References Cited

U.S. PATENT DOCUMENTS

| | | | |
|---|---|---|---|
| 108,075 | 6/1883 | Gotou | 360/97 |
| 4,539,612 | 9/1985 | Sidhu et al. | 360/97 |
| 4,541,086 | 9/1985 | Tanaka | 369/271 |

FOREIGN PATENT DOCUMENTS

| | | |
|---|---|---|
| 0099005 | 6/1983 | European Pat. Off. . |
| 0133312 | 7/1984 | European Pat. Off. . |
| 2304136 | 10/1976 | France . |
| 0114166 | 9/1981 | Japan .................. 369/270 |
| 0247849 | 12/1985 | Japan .................. 369/270 |
| 0247851 | 12/1985 | Japan .................. 369/270 |
| 1538568 | 3/1976 | United Kingdom . |
| 2088113A | 7/1981 | United Kingdom . |

OTHER PUBLICATIONS

Patent Abstract of Japan, vol. 9, No. 122, p-359 [1845], 5/28/85 and JP-A-60 7642, (Hitachi Seisakusko K.K.), 1-16-85.
Patent Abstract of Japan, vol. 9, No. 285, P-204 [2008], 11-12-85; and JP-A-60-124 057, (Olymous Kogaku Kogyo K.K.), 7-2-85.

*Primary Examiner*—Stuart N. Hecker
*Assistant Examiner*—David J. Severin

[57] ABSTRACT

A disc clamping device comprises a disc base on which to set a disc and which has a spindle for rotating the disc, and a disc holding member movable in the axial direction of the spindle. The disc holding member comprises a portion for pressing a disc with a centering hub and a portion to be engaged with the center hole of a disc with no centering hub.

4 Claims, 2 Drawing Sheets

DISC CLAMPING DEVICE

BACKGROUND OF THE INVENTION

The present invention relates to a disc clamping device for engaging an information recording disc such as an optical disc or an optical magnetic disc coaxially with a turntable.

As a conventional disc clamping device, a magnetic fixing device is shown in FIG. 3 in which 1 is a turntable, 2 is a spindle, 3 is a magnet embedded in the turntable 1, 4 is an information recording disc 4, 5 is a ferromagnetic centering hub on the disc 4, and 6 is a center hole in the centering hub 5.

The turntable 1 integrally fixed to the spindle 2 is designed to rotate the information recording disc 4. The centering hub 5 is fixed on the disc 4 by bonding. The center hole 6 of the centering hub 5 has such a diameter as fits on the spindle 2 with a specified clearance.

The sequence of fixing the information recording disc 4 on the above conventional disc clamping device is as follows. The spindle 2 is inserted into the center hole 6 of the centering hub 5 for centering the disc 4. Then, the magnet 3 attracts the ferromagnetic centering hub 5 thereby fixing the disc 4 on the turntable 1.

The above conventional device has the following problems. The spindle 2 is required to have such an accurate diameter as fits in the center hole 6 of the centering hub 5 with the specified clearance. However, the centering hub hole can differ in diameter from disc to disc. Some discs may have too small a centering hub hole for the spindle to fit in, and some may have too large a centering hub hole to properly center the discs, resulting in the center being displaced so that the recording/reading head cannot trace the tracks.

The disc clamping device has another problem for an information recording disc that has no center hole because of a manufacturing process-related reason. Supposing the spindle is inserted in the centering hub hole of such a disc, if the axial length of the spindle effective for engagement with the centering hub is greater than the thickness of the centering hub, the spindle end engages the disc face, preventing the disc from being fixed in the device.

SUMMARY OF THE INVENTION

To overcome the above problems, an object of the present invention is to provide a disc clamping device capable of smoothly centering an information recording disc for securely fixing the disc on the turntable.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a disc clamping device comprises a turntable on which to set a disc and which has a spindle for transmitting the turning effect to the disc, and a disc holding member movable in the axial direction of the spindle which member comprises a portion to press a disc with centering hub and a portion for engagement with the center hole of a disc with no centering hub.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
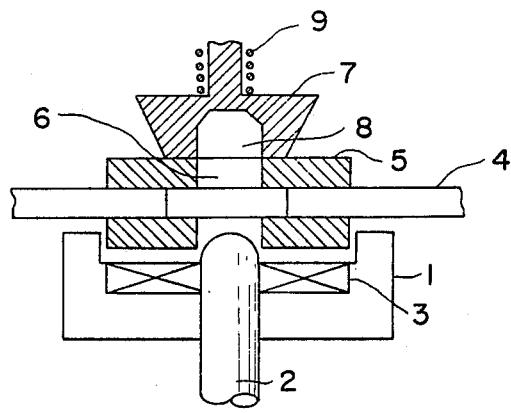
FIGS. 1 and 2 are side sectional views of an embodiment of a disc clamping device of the present invention.
Figure 3:
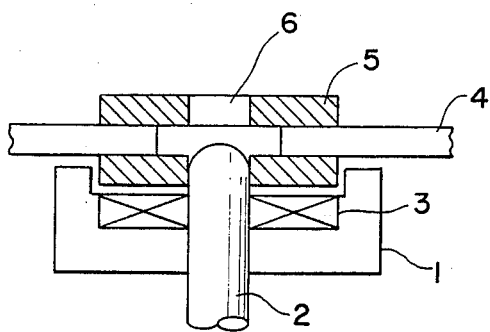
FIG. 3 is a side sectional view of the conventional disc clamping device.

FIG. 1 is a side sectional view of an embodiment of the invention. The same reference numbers are allotted to parts identical with those of FIG. 3. Referring to FIG. 1, 1 is a turntable, 2 is a spindle, 3 is a magnet embedded in the turntable 1, 4 is an information recording disc, 5 is a centering hub made of ferromagnetic substance bonded on the information recording disc 4, and 6 is the center hole of the centering hub 5. The center hole 6 has a diameter permitting the spindle 2 to be inserted and fixed therein. 7 is a disc holding member including a portion tapering downwardly. 8 is the center hole in the disc holding member 7. The center hole 8 has a diameter which permits the spindle 2 to be inserted and fixed in the center hole 8. 9 is a compression spring for pressing the disc holding member 7 downwardly.

The operation of the disc clamping device of the present invention is described in the following. The disc holding member 7 is lifted upwardly by a mechanism in the disc recorder reader (not shown). The information recording disc 4 is inserted in the space between the disc holding member 7 and the turntable 1. The disc 4 is then set with the center hole 6 approximately over the spindle 2 by an initial positioning mechanism. The disc 4 lowers because of its weight or the turntable 1 rises, so that the spindle 2 is inserted into the center hole 6, thus centering the disc 4. Due to the attracting force between the ferromagnetic centering hub 5 and the magnet 3 embedded in the turntable 1, the disc 4 is securely fixed on the turntable 1.

The disc is clamped in the above operation when it has a centering hub. Some discs have no center hole for the purpose of simplifying the manufacturing process. To accommodate such discs, the spindle is designed so that the spindle end inserted into the centering hub 5 does not come in contact with the disc 4. More specifically, the length effective for engagement of the spindle does not exceed the thickness of the centering hub 5, or alternatively the spindle may be axially slidable.

Figure 2:
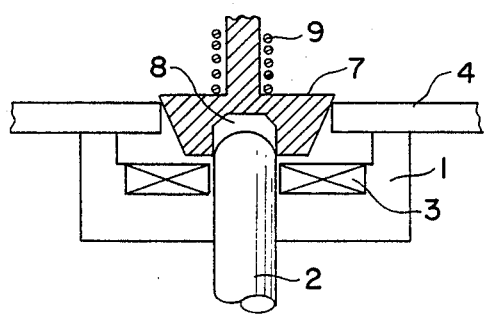

FIG. 2 explains the operation of the disc clamping device for an information recording disc with no centering hub. The disc 4 is placed around the center hole of the turntable 1 by the initial positioning mechanism. The disc holding member 7 is lowered in the axial direction, centering the disc 4. The disc holding member 7 is further lowered until the center hole 8 of the disc holding member 7 comes in engagement with the spindle 2, thereby centering the disc 4 accurately. Since the disc holding member 7 holds the disc 4 by the tapered circumferential wall of the conical section, it can hold a disc with various center hole diameters. The disc holding member 7 is pressed against the disc 4 due to the elasticity of the compression spring 9 provided in the upper part of the disc holding member 7. To increase the clamping force, the disc holding member 7 may be made of ferromagnetic material so that the magnet 3 in the turntable 1 and the disc holding member 7 attract each other.

As described above, the disc clamping device of the present invention comprises the disc base on which to set a disc and which has the spindle for rotating the disc, and the disc holding member which is movable in the axial direction of the spindle and which comprises the portion for pressing a disc with centering hub and the portion for engagement with the center hole of a disc with no centering hub. Accordingly, the disc clamping device of the present invention provides a substantial advantage in that it can clamp a disc securely regardless of difference in the construction. Since the device is capable of clamping a disc with no center hole, it helps solve various problems in the disc manufacturing process; the disc with no center hole provides such advantages as reduction in material processing cost, ease in forming recording layer and ease in transportation and handling.

While only certain embodiments of the present invention have been described, it will be apparent to those skilled in the art that various changes and modifications may be made therein without departing from the spirit and scope of the present invention as claimed.

What is claimed is:

1. A disc clamping device capable of clamping a disc with or without a centering hub comprising;
   a rotatably mounted disc base for supporting an information recording disc;
   a spindle extending from the center of said disc base and fixed thereto, said spindle having a center line;
   a disc holding member spaced above said spindle and supported for movement in an axial direction along a center line thereof toward said spindle;
   said spindle center line and said disc holding member center line being in alignment;
   said disc base including magnetic means positioned around said spindle for interaction with any disc having a hub made of a ferromagnetic substance; and
   said disc holding member including means for pressing a disc with a centering hub against said disc base and separate means for engagement with the center hole of a disc with no centering hub in order to press such a disc against said disc base.

2. The disc clamping device of claim 1, wherein said disc holding member is made of ferromagnetic material.

3. The disc clamping device of claim 1, wherein said disc holding member has a center hole.

4. The disc clamping device of claim 1, wherein said means for pressing a disc with a centering hub against said disc base is a flat end surface and said separate means for engagement with the center hole of a disc with no centering hub is a tapered side surface located above said flat end surface.

* * * * *